(12) United States Patent
Tao et al.

(10) Patent No.: US 10,997,943 B2
(45) Date of Patent: May 4, 2021

(54) PORTABLE COMPUTE CASE FOR STORING AND WIRELESSLY COMMUNICATING WITH AN EYEWEAR DEVICE

(71) Applicant: FACEBOOK TECHNOLOGIES, LLC, Menlo Park, CA (US)

(72) Inventors: David Tao, Santa Clara, CA (US); Dong Yang, Milpitas, CA (US); Samvit Monga, Sunnyvale, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 28 days.

(21) Appl. No.: 15/910,406

(22) Filed: Mar. 2, 2018

(65) Prior Publication Data

US 2019/0272800 A1 Sep. 5, 2019

(51) Int. Cl.
| | | |
|---|---|---|
| G09G 5/00 | (2006.01) | |
| A45C 11/04 | (2006.01) | |
| H02J 50/10 | (2016.01) | |
| H04W 88/02 | (2009.01) | |
| H04W 76/10 | (2018.01) | |
| H02J 7/02 | (2016.01) | |

(52) U.S. Cl.
CPC .............. *G09G 5/006* (2013.01); *A45C 11/04* (2013.01); *G09G 2330/021* (2013.01); *G09G 2370/16* (2013.01); *H02J 7/025* (2013.01); *H02J 50/10* (2016.02); *H04W 76/10* (2018.02); *H04W 88/02* (2013.01)

(58) Field of Classification Search
None
See application file for complete search history.

(56) References Cited

U.S. PATENT DOCUMENTS

| 5,977,935 A * | 11/1999 | Yasukawa ............ G02B 27/017 340/980 |
|---|---|---|
| 2005/0185916 A1* | 8/2005 | Jost ........................ A45C 13/02 386/361 |
| 2007/0281752 A1* | 12/2007 | Lewis .................... A45C 11/04 455/569.1 |
| 2008/0143678 A1* | 6/2008 | Sadler .................. G02B 27/017 345/168 |
| 2009/0243966 A1* | 10/2009 | Kato .................... G02B 27/017 345/8 |
| 2011/0092294 A1* | 4/2011 | Mercier .................. A63F 13/90 463/46 |
| 2016/0187974 A1* | 6/2016 | Mallinson ............... G06F 3/014 463/32 |
| 2017/0045941 A1* | 2/2017 | Tokubo ................... G06F 3/167 |
| 2017/0093079 A1* | 3/2017 | Wagman ................ A45C 11/00 |
| 2018/0001198 A1* | 1/2018 | Frappiea ................. A63F 13/49 |

(Continued)

*Primary Examiner* — Kirk W Hermann
(74) *Attorney, Agent, or Firm* — FisherBroyles, LLP (57) ABSTRACT

A portable compute case for eyewear devices may include a wireless transceiver and a computation component that includes at least one processor. The portable compute case may be configured to house an eyewear device; establish, using the wireless transceiver, a communicative connection between the portable compute case and the eyewear device; generate, using the computation component, processed sensor data; and transmit, using the wireless transceiver, the processed sensor data to the eyewear device for display by the eyewear device. Various other systems and methods are also disclosed.

20 Claims, 8 Drawing Sheets

(56) References Cited

U.S. PATENT DOCUMENTS

2018/0224909 A1* 8/2018 Koo ...................... G06F 1/1632
2018/0272231 A1* 9/2018 Katoh .................... G01B 11/26
2019/0027113 A1* 1/2019 Kaine .................... G09G 5/006
2019/0173294 A1* 6/2019 Paulson ................ H02J 7/0021

* cited by examiner

PORTABLE COMPUTE CASE FOR STORING AND WIRELESSLY COMMUNICATING WITH AN EYEWEAR DEVICE

BACKGROUND

Virtual reality (VR) or augmented reality (AR) eyewear devices and headsets may enable users to experience exciting events, such as interacting with people in a computer-generated simulation of a three-dimensional world or viewing data superimposed on a real-world view. VR or AR eyewear devices and headsets may also be used for purposes other than recreation—governments may use them for military training simulations, doctors may use them to practice surgery, and engineers may use them as visualization aids.

Unfortunately, VR and AR systems often require significant computing resources to generate such immersive virtual and augmented reality environments. Because of this, conventional "untethered" VR/AR systems (i.e., systems that do not offload VR/AR compute operations to external computing devices) are often bulky, heavy, hot (due to the heat generated by their onboard computing components) and, thus, uncomfortable for end users to wear. Moreover, conventional attempts to reduce the size or weight of such systems also typically reduce the computational capabilities of the system, which may in turn prevent the end user from properly experiencing a true VR or AR environment.

SUMMARY

As will be described in greater detail below, the instant disclosure generally relates to a portable compute case designed to both house an AR/VR eyewear device and handle a variety of compute operations on behalf of the same. In one example, this portable compute case may include a wireless transceiver and a computation component that includes at least one processor. The portable compute case, which may be configured to house an eyewear device, may be configured to establish, using the wireless transceiver, a communicative connection between the portable compute case and the eyewear device; generate, using the computation component, processed sensor data; and transmit, using the wireless transceiver, the processed sensor data to the eyewear device for use by the eyewear device (e.g., the eyewear device may display AR/VR image data processed by and received from the portable compute case).

According to some embodiments, the portable compute case may further include a power management component configured to transfer power to the eyewear device. The power management component may include a charging element configured to draw power from an alternating current (AC) power source, a power storage element configured to store power from the AC power source, and/or a transmitting coil configured to inductively transfer power to the eyewear device. In some embodiments, the portable compute case may further include at least one sensor configured to detect when the portable compute case has been opened and, in response, direct the eyewear device to power on. This sensor may also be configured to detect when the eyewear device is positioned inside the portable compute case and, in response, direct the power management component to inductively transfer power to the eyewear device.

In some embodiments, the portable compute case may include at least one external-facing camera configured to capture sensor data for tracking a user of the eyewear device and/or to capture sensor data for localization of the eyewear device. In these embodiments, the portable compute case may be configured to tune an antenna of the wireless transceiver based at least in part on the localization of the eyewear device.

In some examples, the portable compute case may include a light-emitting diode (LED) configured to indicate a power status of the portable compute case and/or the eyewear device. In some embodiments, the portable compute case may be configured to compress the processed sensor data and then transmit the compressed processed sensor data to the eyewear device for use by the eyewear device.

Similarly, a corresponding system may include an eyewear device that includes an eyewear-side wireless transceiver and a portable compute case. The portable compute case may include a case-side wireless transceiver and a computation component that includes at least one processor. The portable compute case may be configured to house the eyewear device; establish a communicative connection between the case-side wireless transceiver of the portable compute case and the eyewear-side wireless transceiver of the eyewear device; generate, using the computation component, processed sensor data; and transmit, using the case-side wireless transceiver, the processed sensor data to the eyewear device for use by the eyewear device.

In some embodiments, the eyewear device may include a battery or a wireless charging component. The portable compute case may further include a power management component configured to inductively transfer power from the portable compute case to the battery of the eyewear device using the wireless charging component. In some examples, the portable compute case may include at least one sensor configured to detect when the portable compute case has been opened and, in response, direct the eyewear device to power on. This sensor may also be configured to detect when the eyewear device is positioned inside the portable compute case and, in response, direct the power management component to inductively transfer power to the eyewear device.

In some embodiments, the eyewear device may further include a plurality of external-facing cameras configured to capture sensor data and a camera data aggregation component configured to aggregate the sensor data captured by the plurality of external-facing cameras for positional tracking. The eyewear device may be configured to transmit, using the eyewear-side wireless transceiver, at least a portion of the sensor data captured by the plurality of external-facing cameras to the case-side wireless transceiver of the portable compute case for processing by the computation component of the portable compute case.

In some examples, the eyewear device may further include a display element configured to display the processed sensor data. The eyewear device may also include an eyewear-side computation component configured to receive processed data from the portable compute case (or another external computing device), decompress the processed data, and use the decompressed processed data on the display element.

In some embodiments, the eyewear device may further include an infrared light emitting diode (LED) configured to emit infrared light to facilitate tracking of the eyewear device by the portable compute case. In some examples, the eyewear device may further include an audio sensor configured to capture audio data. In some embodiments, the eyewear device may also include an inertial measurement unit (IMU) sensor configured to capture a force or angular rate of the eyewear device.

A corresponding method may include establishing, by a wireless transceiver of a portable compute case that is dimensioned to house an eyewear device, a communicative connection between the portable compute case and the eyewear device; generating, by a computation component of the portable compute case, processed sensor data; and transmitting the processed sensor data to the eyewear device for use by the eyewear device.

In some examples, the above-described method may be encoded as computer-readable instructions on a computer-readable medium. For example, a computer-readable medium may include one or more computer-executable instructions that, when executed by at least one processor of a computing device, may cause the computing device to establish, by a wireless transceiver of a portable compute case that is dimensioned to house an eyewear device, a communicative connection between the portable compute case and the eyewear device; generate, by a computation component of the portable compute case, processed sensor data; and transmit the processed sensor data to the eyewear device for use by the eyewear device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to a portable compute case for eyewear devices, such as an AR or VR headset or eyewear device. In some embodiments, the portable compute case may represent a portable companion device designed to offload at least a portion of the AR/VR compute workload from the eyewear device or headset. By coupling the AR and VR eyewear device to the portable compute case and offloading much of the compute workload to the case from the eyewear device, the number and/or complexity of components on the eyewear device may (in some examples) be reduced significantly, resulting in a lighter, cooler, and more ergonomic or comfortable eyewear device, while still providing a true AR/VR experience. In addition, by providing this external compute functionality in the form of a case dimensioned to house the eyewear device, the portable compute case may eliminate the need for end users to separately carry and/or remember the location of other external computing devices. Moreover, by including components capable of wirelessly charging the eyewear device when the eyewear device is stored, the portable compute case may eliminate the need for end users to carry additional charging equipment, such as external AC/DC adapters.

Figure 1:
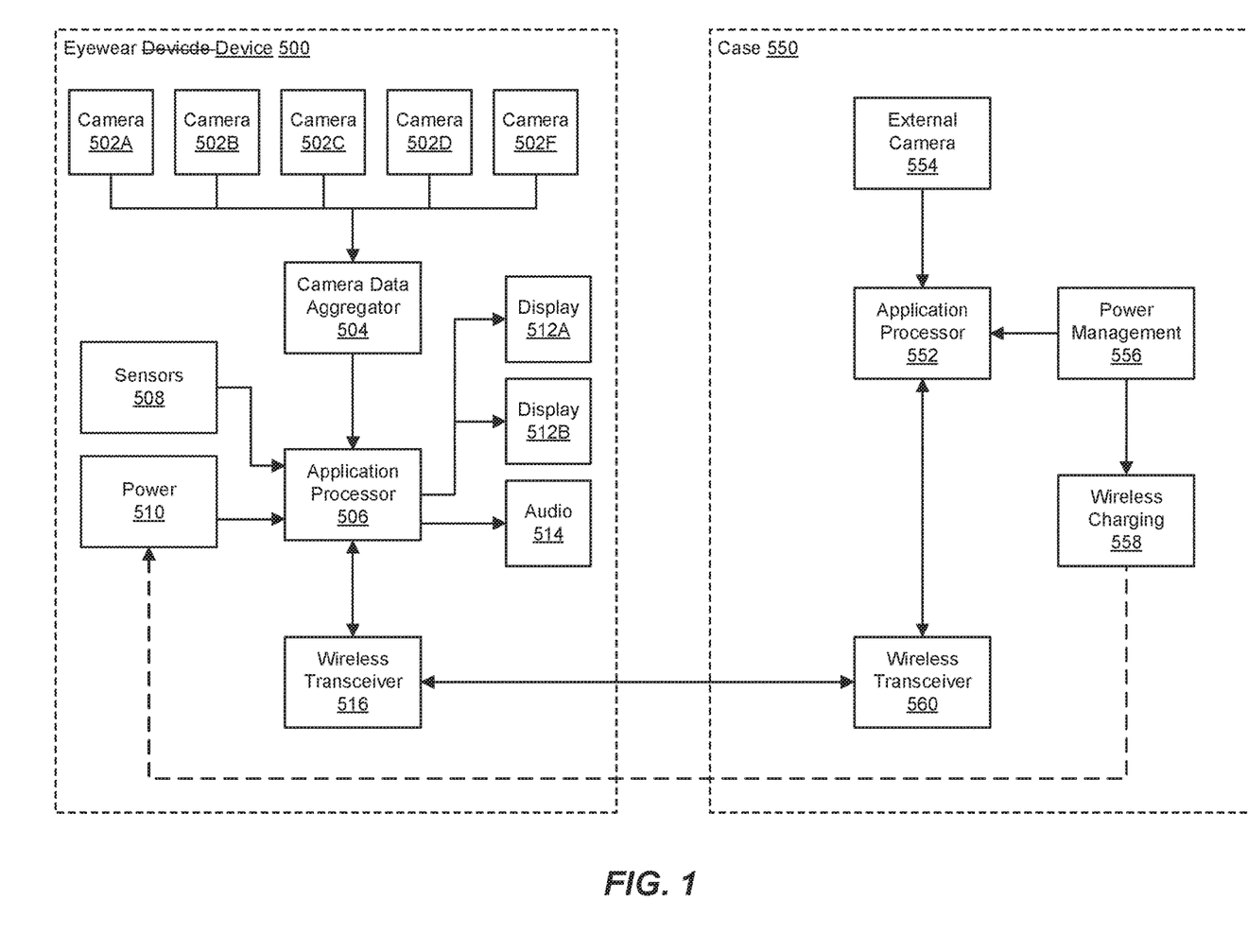
FIG. 1 is a perspective view of an exemplary portable compute case and an exemplary eyewear device in accordance with one or more embodiments of the disclosure.

Now referring to FIG. 1, a perspective view depicts an exemplary portable compute case 100 and an exemplary eyewear device 150 in accordance with one or more embodiments of the disclosure. The portable compute case 100 and its corresponding eyewear device 150 may take any of a variety of shapes or forms. In the example illustrated in FIG. 1, the eyewear device 150 may represent AR glasses designed to superimpose images or data onto a user's real-world view. In this example, the portable compute case 100 may be dimensioned (i.e., sized or shaped) to house or store the eyewear device 150. In some embodiments, the portable compute case 100 may be made of a water resistant or water repellant material, such as leather, synthetic leather, synthetic fiber, or the like. In addition, the portable compute case 100 may include a securing mechanism, such as a zipper, snaps, or positional hinge. As will be explained in greater detail below in connection with FIGS. 5-8, the portable compute case 100 may also include a variety of components that enable it to wirelessly pair with, and perform a variety of computational tasks on behalf of, the eyewear device 150. The portable compute case 100 may thus serve as a storage case for the eyewear device 150 as well providing additional computational power for the same to enable the eyewear device 150 to remain lightweight and comfortable for the user.

Figure 2:
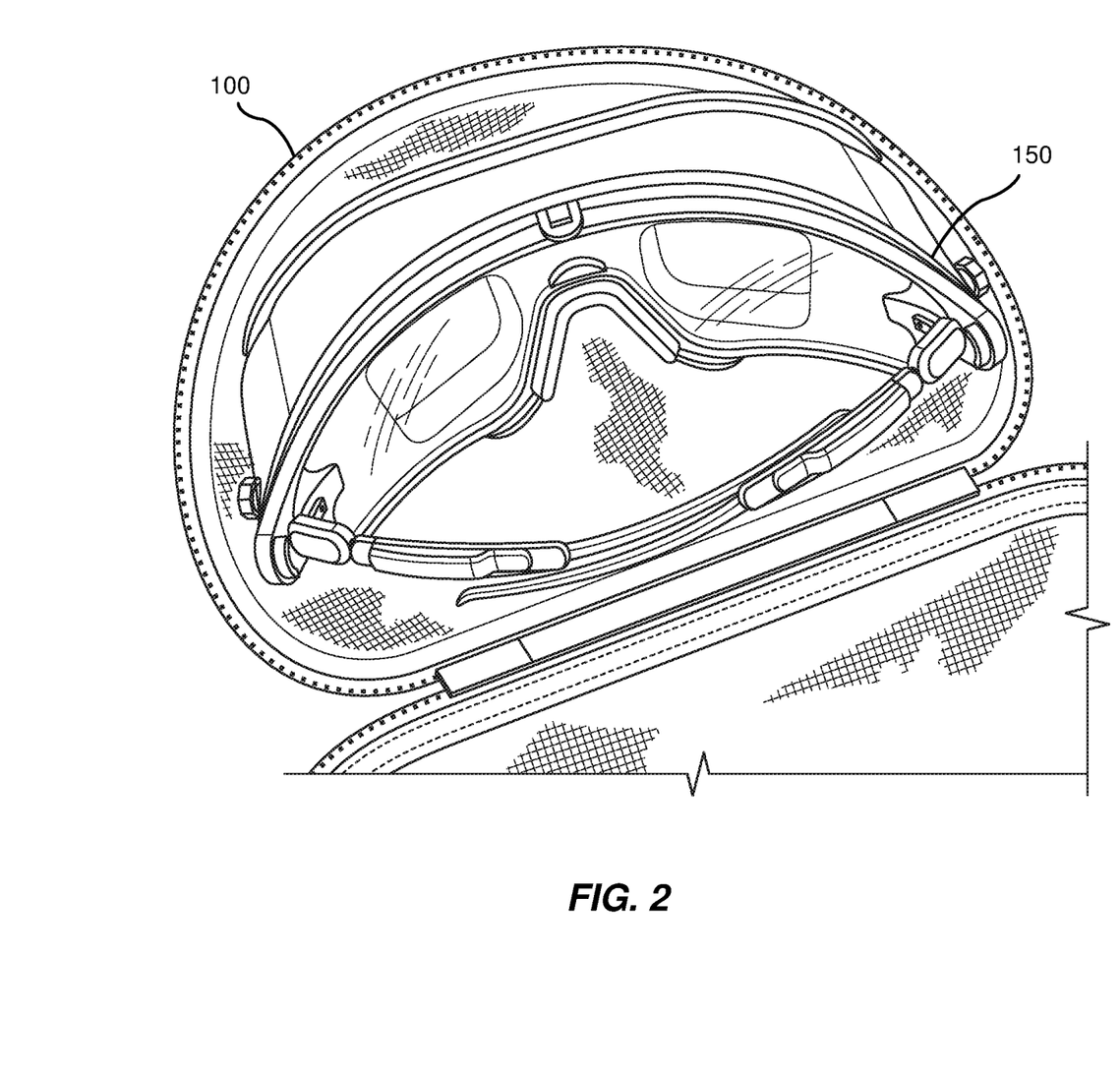
FIG. 2 is a perspective view of an exemplary portable compute case holding an exemplary eyewear device in accordance with one or more embodiments of the disclosure.

Now referring to FIG. 2, a perspective view depicts the portable compute case 100 holding the exemplary eyewear device 150 from FIG. 1. As shown in this figure, the portable compute case 100 may be dimensioned to house or store the eyewear device 150. Thus, in addition to reducing the computational load imposed on exemplary eyewear device 150 (as will be explained in greater detail in connection with FIGS. 5-8), portable compute case 100 may also serve the utilitarian purpose of storing and/or charging the eyewear device 150 when not in use. As the user is likely to store the eyewear device 150 in some type of case to prevent unnecessary damage to the device, the portable compute case 100 may represent an accessory that the user does not necessarily have to track independent of the eyewear device 150. Rather, the portable compute case 100 may serve as a cover or storage for the eyewear device 150 while also offloading a variety of computational tasks from the same, resulting a lighter, cooler, and/or more ergonomic eyewear device.

As detailed above, the portable compute cases disclosed herein may be dimensioned to house and/or offload compute functionality from a variety of different shapes and forms of AR/VR headsets and eyewear devices. Now referring to FIG. 3, a perspective view depicts an additional example of an eyewear device 300 and its components in accordance with one or more embodiments of the disclosure. In this example, the eyewear device 300 may represent a VR headset designed to display three-dimensional, computer-generated images. As detailed above, by offloading computational tasks to an associated compute case (such as portable compute case 400 in FIG. 4), the eyewear device 300 may be streamlined to ensure that the eyewear device 300 is lighter, cooler, and more ergonomic or comfortable than traditional VR headsets.

Figure 3:
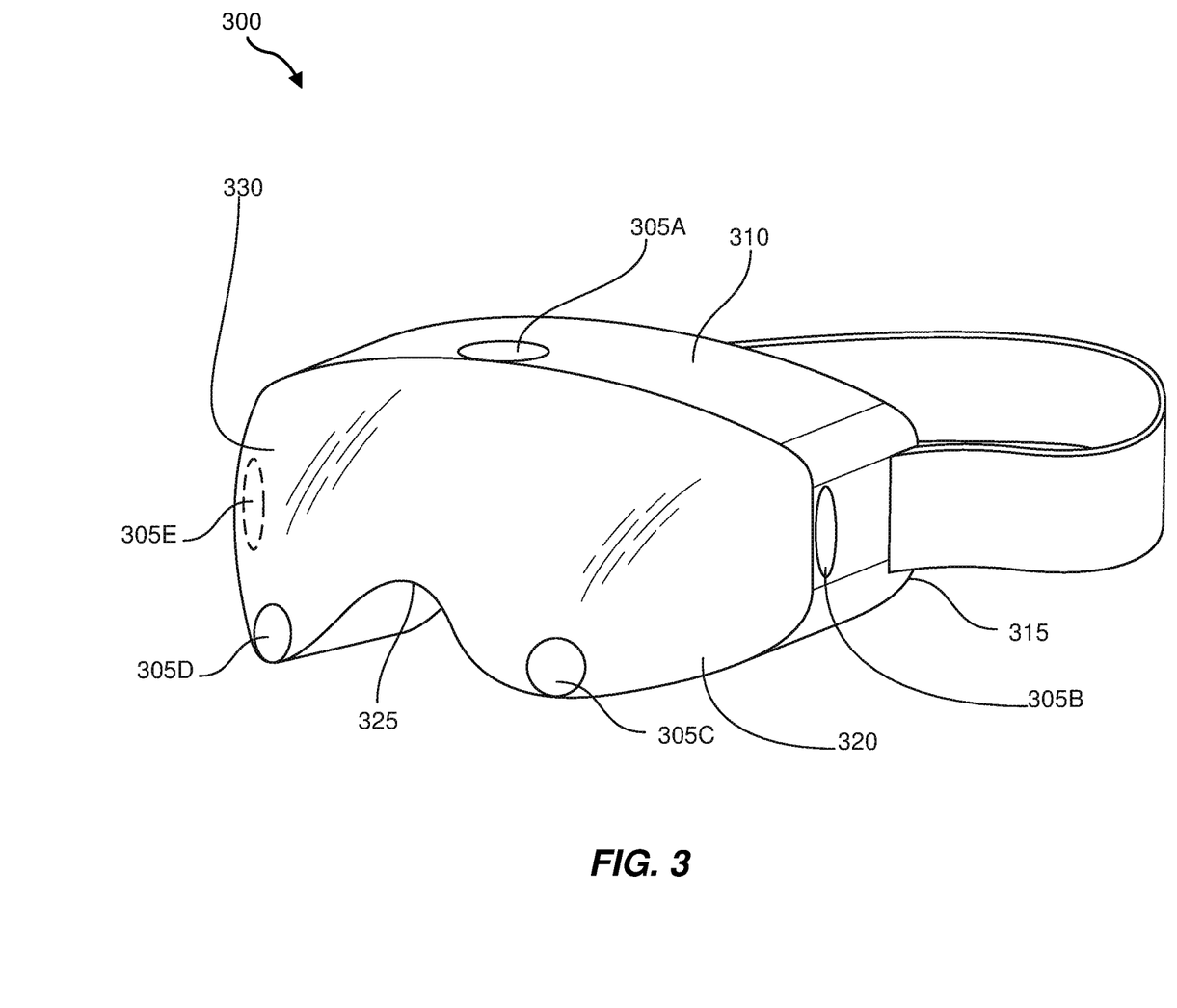
FIG. 3 is a perspective view of an additional exemplary eyewear device and its components in accordance with one or more embodiments of the disclosure.

As will be described in greater detail in connection with FIGS. 5-8, the eyewear device 300 illustrated in FIG. 3 may include any of a variety of components associated with generating AR/VR experiences. Examples of such components include, without limitation, sensors (e.g., image sensors, audio sensors, inertial measurement units, etc.), computational components (e.g., general-purpose processors, special-purpose processors, etc.), communication components (e.g., transceivers), display components, and/or power management components (e.g., inductive charging components, batteries, etc.). For example, as illustrated in FIG. 3, the eyewear device 300 may include multiple cameras, such as 305A-305E, embedded in different sections of the eyewear device 300 to capture images or data in its surrounding environment. The eyewear device 300 may also include a power storage component or battery 310 to store power to enable the eyewear device 300 to function. In addition, the eyewear device 300 may include spatial audio components 315 that enable the user to hear audio data transmitted to the eyewear device 300 as part of an AR or VR experience.

In some embodiments, the eyewear device 300 may include a plurality of display panels 320 configured to display computer-generated imagery (e.g., AR or VR imagery). In some examples, the display panels 320 may permit the user to see the real-world through clear lenses but may superimpose or augment the real-world view with additional computer-generated information.

In some embodiments, the eyewear device 300 may include a wireless charging receiver 325. As will be explained in greater detail in connection with FIGS. 5-8 below, the wireless charging receiver 325 may enable the eyewear device 300 to wirelessly (i.e., inductively) receive power from a portable compute case or other device, such as portable compute case 400 in FIG. 4.

In some examples, and as will be described in greater detail in connection with FIG. 5 below, the eyewear device 300 may include a variety of computational and/or wireless transceiver components designed to process and/or manage data captured by the eyewear device 300 as well as data transmitted to and/or received from the portable compute case 400.

Figure 4:
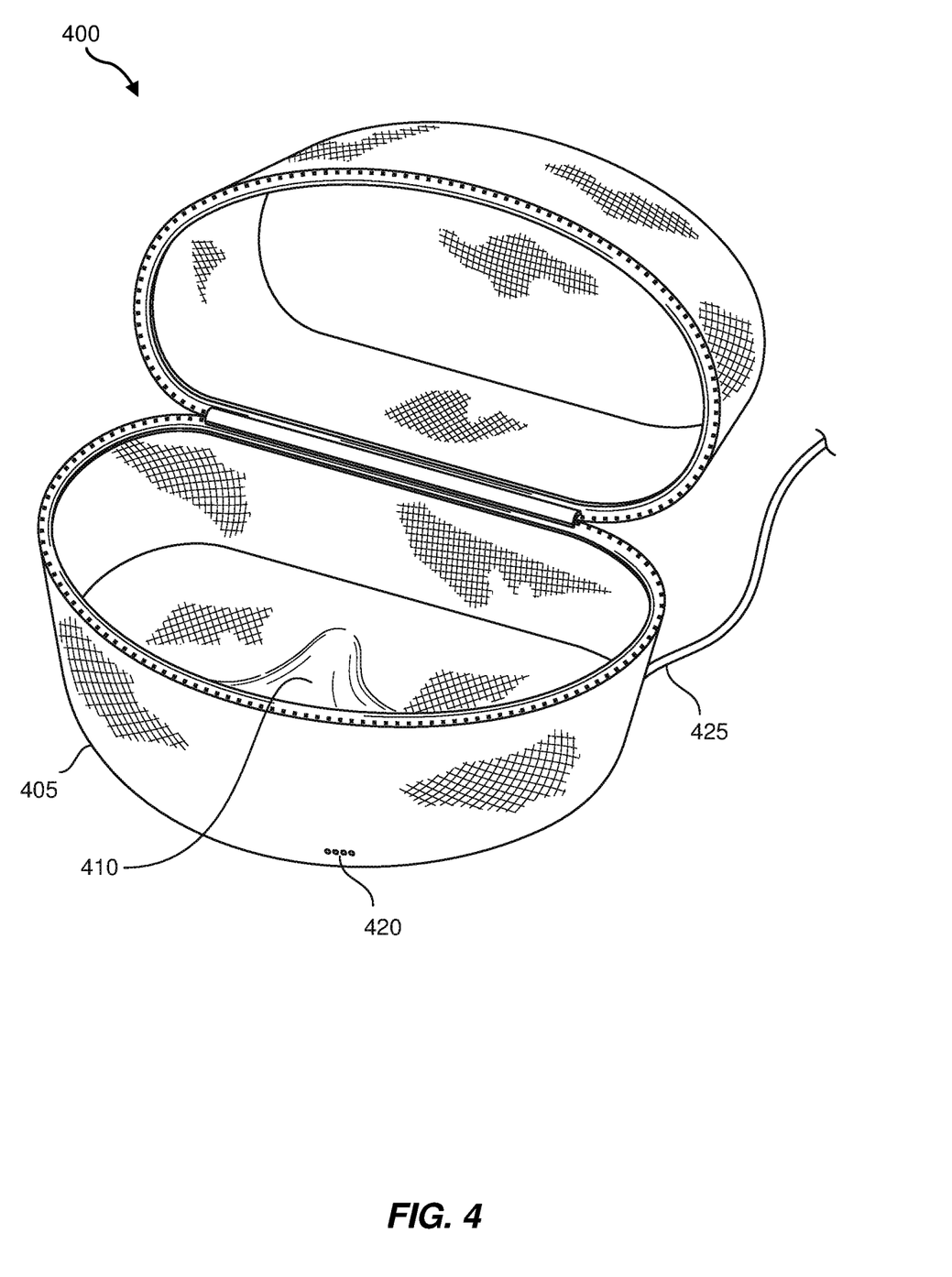
FIG. 4 is a perspective view of an additional exemplary portable compute case and its components in accordance with one or more embodiments of the disclosure.

Now referring to FIG. 4, a perspective view depicts a portable compute case 400 designed to house and perform computational tasks on behalf of the eyewear device 300 illustrated in FIG. 3. As will be explained in greater detail below, by coupling the eyewear device 300 to the portable compute case 400 and offloading much of the compute workload to the portable compute case 400 from the eyewear device 300, the number and/or complexity of components on the eyewear device 300 may be reduced significantly.

As will be described in greater detail in connection with FIGS. 5-8, the portable compute case 400 illustrated in FIG. 4 may include any of a variety of components associated with generating AR/VR experiences. In some embodiments, the portable compute case 400 may include a charging element 425 configured to draw power from an AC power source. In some examples, the charging element may have a connection port, such as a universal serial bus (USB) or similar type of port, designed to receive a plug for a cord connected to an AC power source. In some embodiments, the power from the AC power source may be drawn through the cord and stored in a battery of the portable compute case 400. In some examples, the portable compute case 400 may include a computation and wireless transceiver component 405, which may be used to communicatively pair the portable compute case 400 and the eyewear device 300. The computation and wireless transceiver component 405 may, as explained in FIGS. 5-8, facilitate transmission and receipt of data between the devices and may manage the computations offloaded from the eyewear device 300. In some embodiments, the computation and wireless transceiver component 405 may also determine when to inductively transfer power from the case 400 to the eyewear device 300. For example, the portable compute case 400 may include a wireless charge transmitter 410, which may include a transmitting coil to inductively transfer power to the eyewear device 300 from the AC power source or the power storage of the portable compute case 400.

In some embodiments, the portable compute case 400 may also include one or more status indicators 420. In some embodiments, the status indicators 420 may be light emitting diodes (LEDs). The status indicators 420 may be different colors, which may represent different statuses, such as power status of the eyewear device 300, power status of the portable compute case 400, activity status of the portable compute case 400, and the like.

Figure 5:
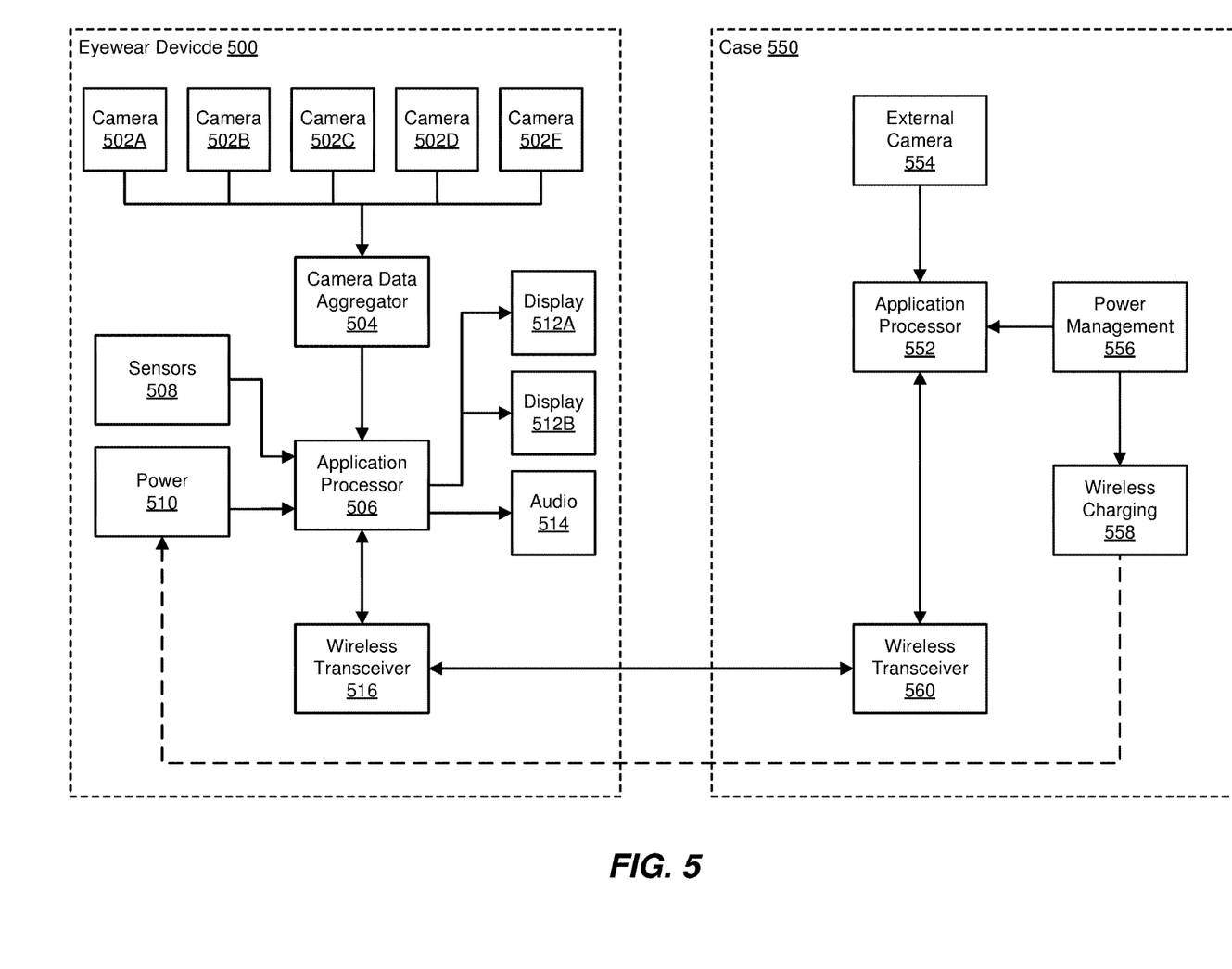
FIG. 5 depicts a block diagram of a data flow between an exemplary portable compute case and an exemplary eyewear device in accordance with one or more embodiments of the disclosure.

FIG. 5 depicts a block diagram illustrating additional components of, and a data flow between, an exemplary portable compute case 550 and an exemplary eyewear device 500. As shown in this figure, eyewear device 500 may include several components. For example, the eyewear device 500 may include multiple cameras 502A-502F positioned at different locations on the eyewear device 500 to obtain information about the environment in which the user is utilizing the eyewear device. As the cameras 502A-502F capture data, a camera data aggregator 504 may receive the information and combine the data based on one or more rules. For example, data may be aggregated based on timestamps, exposure, motion detection, and the like. In some embodiments, the camera data aggregator 504 may facilitate when and how data is captured by one or more cameras 502A-502F of the eyewear device 500. In some examples, the camera data aggregator 504 may aggregate the sensor data captured by the plurality of external-facing cameras 502A-502F for positional tracking.

In some embodiments, the camera data aggregator 504 may accumulate or otherwise amass data from the cameras 502A-502F and may transmit the data to an application processor 506. In some embodiments, the camera data aggregator 504 may compress the data or otherwise process and/or organize the data for consumption by the application processor 506.

In some examples, the application processor 506 may receive additional input from one or more sensors 508, such as a microphone, accelerometer, gyroscope, inertial measurement unit (IMU), or the like. In one example, the application processor 506 may perform computer vision tasks on the data received from the sensors 508 and the camera data aggregator 504. In some embodiments, at least a portion of the processed data may be transmitted to one or more displays 512A-512B of the eyewear device 500. In some examples, the processed data may include audio data, which may be routed to audio components 514 of the eyewear device 500.

In some embodiments, the application processor 506 may transmit at least a portion of the data received from the sensors 508 and the camera data aggregator 504 to the portable compute case 550. In one example, the application processor 506 may compress this data before transmitting the same. In some embodiments, the application processor 506 may direct the wireless transceiver 516 to transmit the data to a wireless transceiver 560 of the portable compute case 550.

In some examples, the wireless transceiver 560 of the case 550 may receive data from eyewear device 500 (e.g., input from sensors 508 and/or data from cameras 502A-502F) and then transmit the same to an application processor 552. If the received data has been compressed by the application processor 506 of the eyewear device 500, then application processor 552 may decompress the data and may perform computations using the data on behalf of the eyewear device 500.

In some embodiments, the portable compute case 550 may include one or more external cameras 554. In these embodiments, the external cameras 554 may provide additional data that may be used by the application processor 552 for tracking a user of the eyewear device 500 and/or for localization of the eyewear device 500. For example, the external cameras 554 may collect and transmit image data (e.g., videos or images) to the application processor 552.

In some examples, the application processor 552 may also receive data from an external computing device, which may be used during the processing of the information received from the eyewear device 500 and/or the external cameras 554 of the case 550.

Additionally, in some embodiments, the case 550 may include a power management component 556 which may communicate with the application processor 552. For example, the power management component 556 may request a current power storage status of the eyewear device 500, which the application processor 552 may request of the eyewear device 500 via the wireless transceiver 560. In some embodiments, the power management component 556 may manage power received from an alternating current (AC) power source. The power management component 556 may then direct a wireless charging component 558 to inductively transfer power from the case 550 to the power component 510 of the eyewear device 500. In some embodiments, the power management component 556 may direct the wireless charging component 558 to transfer power when a sensor indicates that the eyewear device 500 is within the closed case 550. The power management component 556 may also direct the wireless charging component 558 to cease the transfer of power when the sensor detects that the case 550 has been opened.

Figure 6:
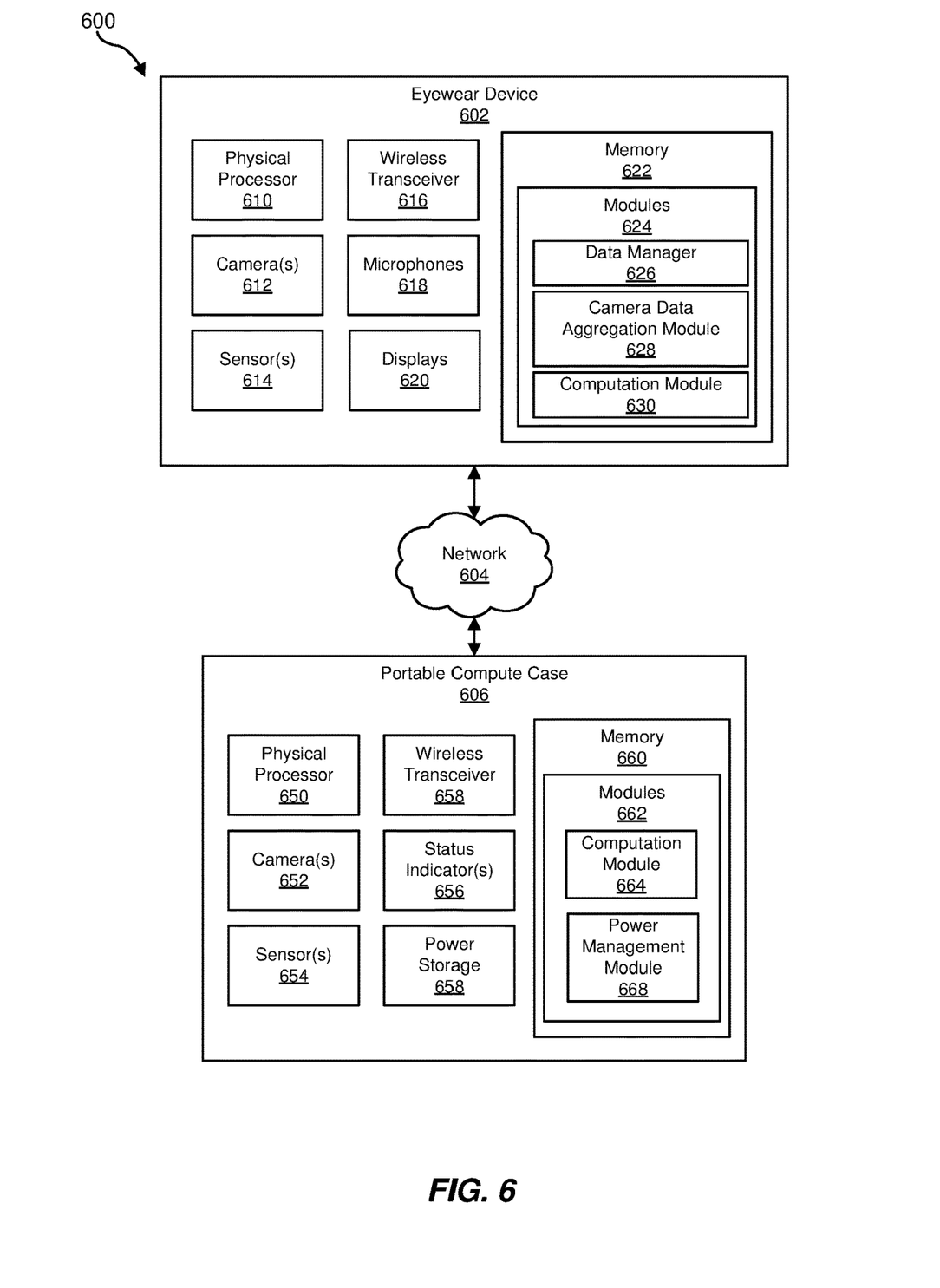
FIG. 6 is a block diagram of an exemplary system that includes a portable compute case and an eyewear device in accordance with one or more embodiments of the disclosure.

FIG. 6 illustrates an additional exemplary subsystem 600 that may be utilized in and/or in conjunction with an eyewear device and portable compute case. As shown in FIG. 6, subsystem 600 may include an eyewear device 602 configured to use data from an AR or VR system. In one example, the eyewear device 602 may be coupled to a portable compute case 606.

In some embodiments, the example eyewear device 602 may include one or more physical processors, such as physical processor 610. Physical processor 610 generally represents any type or form of hardware-implemented processing unit capable of interpreting and/or executing computer-readable instructions. In one example, physical processor 610 may access and/or modify one or more of modules 624 stored in memory 622. Additionally, or alternatively, physical processor 610 may execute one or more of modules 624 to facilitate offloaded computations from the eyewear device 602 to the portable compute case 606.

In some embodiments, the eyewear device 602 may include one or more cameras 612. The cameras 612 may be any type of image sensor that may be mounted or embedded in the eyewear device 602 and is capable of capturing image data, such as pictures or video data. Examples of cameras 612 may include, but are not limited to, red green blue (RGB) cameras, pass-through cameras, and depth-sensing cameras.

In some embodiments, the eyewear device 602 may include one or more additional sensors 614. Examples of sensors 614 may include, but are not limited to, infrared sensors (e.g., to track hand movements, eye movements inside the eyewear device 602, etc.), photocell sensors (e.g., sensors that detect light), and/or inertial measurement units (IMUS) (designed, e.g., to detect specific forces and/or angular rates of the eyewear device 602). In some embodiments, the subsystem 600 may include gyroscopes, accelerometers, and magnetometers, which may provide rich sensor input that can be interpreted by the software as highly accurate and complex movements of a user. In some examples, the eyewear device 602 may include an infrared light emitting diode (LED) configured to emit infrared light to facilitate tracking of the eyewear device 602 by the portable compute case 606.

In some embodiments, the eyewear device 602 may include at least one wireless transceiver 616. Wireless transceiver 616 generally represents any suitable radio and/or wireless transceiver for transmitting and/or receiving signals in the bandwidth and/or channels corresponding to the communications protocols utilized by the eyewear device 602 and the portable compute case 606.

In some examples, the eyewear device 602 may include one or more microphones 618. The microphones 618 may represent any type of audio sensor that may be mounted or embedded in the eyewear device 602 and is capable of capturing audio data, such as environmental sounds or the voice of a user. The eyewear device 602 may also include one or more speakers configured to play any audio data received from the portable compute case 606.

In some embodiments, the eyewear device 602 may include one or more displays 620. The displays 620 may represent any type display panel that may be mounted or embedded in the eyewear device 602 and is capable of presenting data to the user. Examples of displays 620 including, without limitation, liquid crystal displays (LCDs), liquid crystal on silicon (LCos), or organic light-emitting diodes (OLED). In some examples, displays 620 may include multiple micro-displays to increase total resolution and field of view. In addition, displays 620 may display only computer-generated imagery (CGI), only live imagery from the physical world, or a combination thereof. In one example, various lenses and/or semi-transparent mirrors may also be embedded in the eyewear device 602.

As illustrated in FIG. 6, example eyewear device 602 may also include one or more memory devices, such as memory 622. Memory 622 generally represents any type or form of volatile or non-volatile storage device or medium capable of storing data and/or computer-readable instructions. In one example, memory 622 may store, load, and/or maintain one or more of modules 624.

In certain embodiments, one or more of modules 624 in FIG. 6 may represent one or more software applications or programs that, when executed by a computing device, may cause the computing device to perform one or more tasks. For example, and as will be described in greater detail below, one or more of modules 624 may represent modules stored and configured to run on eyewear device 602. One or more of modules 624 may also represent all or portions of one or more special-purpose computers configured to perform one or more tasks.

In at least one embodiment, the eyewear device 602 may include a data manager 626 that manages the data flow to and from the eyewear device 602. For example, data manager 626 may communicate with the camera data aggregation module 628 to determine when and how to transmit data from the cameras 612 to the portable compute case 606. The data manager 626 may also communicate with the sensors 614, microphones 618, and displays 620 to receive and/or transmit data accordingly.

In at least one embodiment, the eyewear device 602 may include a camera data aggregation module 628 that receives data from the one or more cameras 612 of the eyewear device 602. For example, camera data aggregation module 628 may include image data, such as pictures or videos, that are transmitted to the portable compute case 606 for further processing. As will be described in greater detail below, such image data may be captured by the cameras 612 and transmitted to the portable compute case 606 for processing. Processed data may be received from the portable compute case 606 and used by the one or more displays 620 of the eyewear device 602.

In at least one embodiment, the eyewear device 602 may include a computation module 630 that may receive data from the one or more cameras 612 of the eyewear device 602. For example, computation module 630 may use the data from the cameras to perform various computer-vision-related tasks.

The eyewear device 602 may be coupled to the portable compute case 606 over one or more networks 604. The network 604 may include, but is not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the network 604 may have any suitable communication range associated therewith and may include, for example, global networks (e.g., the Internet), metropolitan area networks (MANS), wide area networks (WANs), local area networks (LANs), or personal area networks (PANS). In addition, any of the network 604 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The exemplary subsystem 600 of FIG. 6 further includes a portable compute case 606. In some embodiments, the example portable compute case 606 may include one or more physical processors, such as physical processor 650. Physical processor 650 generally represents any type or form of hardware-implemented processing unit capable of interpreting and/or executing computer-readable instructions. In one example, physical processor 650 may access and/or modify one or more of modules 662 stored in memory 660. Additionally, or alternatively, physical processor 650 may execute one or more of modules 662 to facilitate offloaded computations from the eyewear device 602 to the portable compute case 606.

In some embodiments, the portable compute case 606 may include one or more cameras 652. As with the cameras 612 on the eyewear device 602, the cameras 652 may represent any type of image sensor that may be mounted or embedded in the compute case 606 and that is capable of capturing image data, such as RGB cameras and depth-sensing cameras. In some examples, images or data captured by the cameras 652 of the portable compute case 606 may be used for tracking a user of the eyewear device 602 or for localization of the eyewear device 602. For example, the cameras 652 may be configured to capture images that include light from an infrared LED of the eyewear device 602, which may be configured to emit infrared light to facilitate tracking of the eyewear device 602 by the portable compute case 606.

In some embodiments, the portable compute case 606 may include one or more sensors 654. For example, the portable compute case 606 may include a sensor 654 configured to detect both when the eyewear device 602 is positioned within the portable compute case 606 and when the portable compute case 606 is closed and, in response, transmit an instruction to a power management module 668 for further action (e.g., an instruction to inductively transfer power to the eyewear device 602). The sensor 654 may also detect when the portable compute case 606 has been opened and, in response, transmit an instruction to the power management module 668 for further action (e.g., an instruction to stop transferring power to the eyewear device 602 and to turn the eyewear device 602 on).

In some embodiments, the portable compute case 606 may include at least one wireless transceiver 655. In some examples, the portable compute case 606 may tune an antenna of the wireless transceiver 655 based at least in part on the localization of the eyewear device 602.

In some embodiments, the portable compute case 606 may include one or more status indicators 656. For example, the portable compute case 606 may include a light-emitting diode (LED) configured to indicate a power status the portable compute case 606 and/or the eyewear device 602. The status indicator 656 may also indicate whether the portable compute case 606 is coupled to the eyewear device 602 or has an active wireless communication link to a remote computing device. In some embodiments, the status indicator 656 may indicate whether the portable compute case 606 is currently transmitting data to or receiving data from the eyewear device 602.

In some embodiments, the portable compute case 606 may include power storage 658, such as a battery. The power storage 658 may, in some examples, be configured to store power obtained from an alternating current power source. The portable compute case 606 may facilitate transfer of power from the power storage 658 to the eyewear device 602 to charge a battery or power storage of the eyewear device 602 while it is housed in the portable compute case 606.

The example portable compute case 606 may also include one or more memory devices, such as memory 660. As with memory 622, memory 660 generally represents any type or form of volatile or non-volatile storage device or medium capable of storing data and/or computer-readable instructions. In one example, memory 660 may store, load, and/or maintain one or more of modules 662.

In at least one embodiment, the portable compute case 606 may include a variety of modules 662, such as a computation module 664 that receives data and processes the data on behalf of the eyewear device 602 with which it is coupled. For example, computation module 664 may receive data from the data manager 626 of the eyewear device 602 and may use the data for computer vision computations or other types of computations. The computation module 664 may then compress the processed data and transmit the data back to the eyewear device 602, where it may be decompressed and then used by the displays 620 of the eyewear device 602.

In at least one embodiment, the portable compute case 606 may include a power management module 668. In some embodiments, the power management module 668 may be configured to transfer power to the eyewear device 602. For example, a sensor 654 may detect when the portable compute case 606 has been opened and, in response, the power management module 668 may direct the eyewear device 602 to power on. In another embodiment, the sensor 654 may detect when the eyewear device 602 is positioned inside the portable compute case 606 and, in response, the power management module 668 may inductively transfer power to the eyewear device 602. In some embodiments, the power may be transferred from a charging element configured to draw power from an AC power source. In some examples, the power from the AC power source may be stored in power storage 658 of the portable compute case 606. In some embodiments, the power management module 668 may facilitate a transmitting coil of the portable compute case 606 to inductively transfer power to the eyewear device 602 from the AC power source or the power storage 658.

Figure 7:
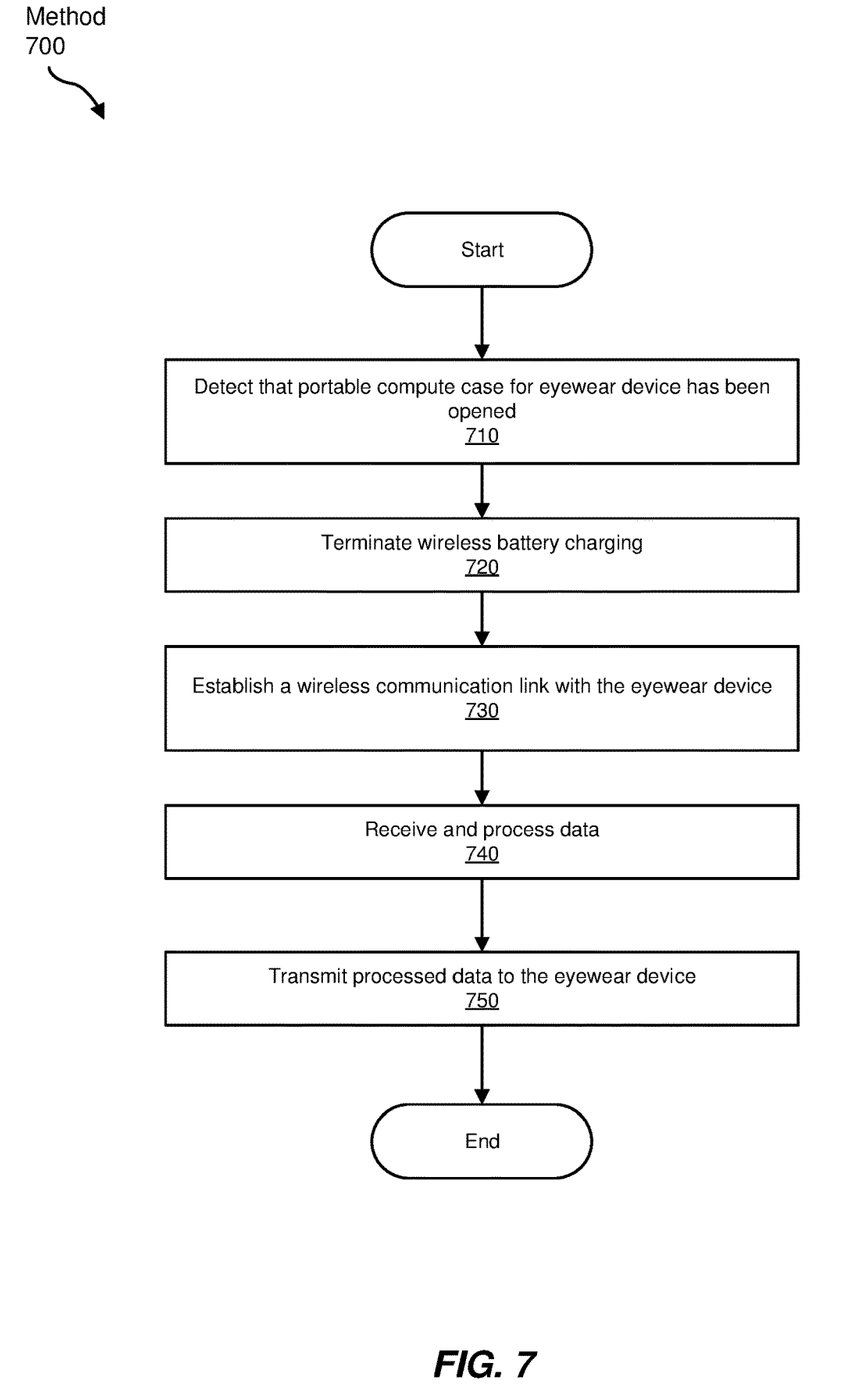
FIG. 7 is a flow diagram of a method for coupling a portable compute case and eyewear device from the perspective of the portable compute case in accordance with one or more embodiments of the disclosure.
Figure 8:
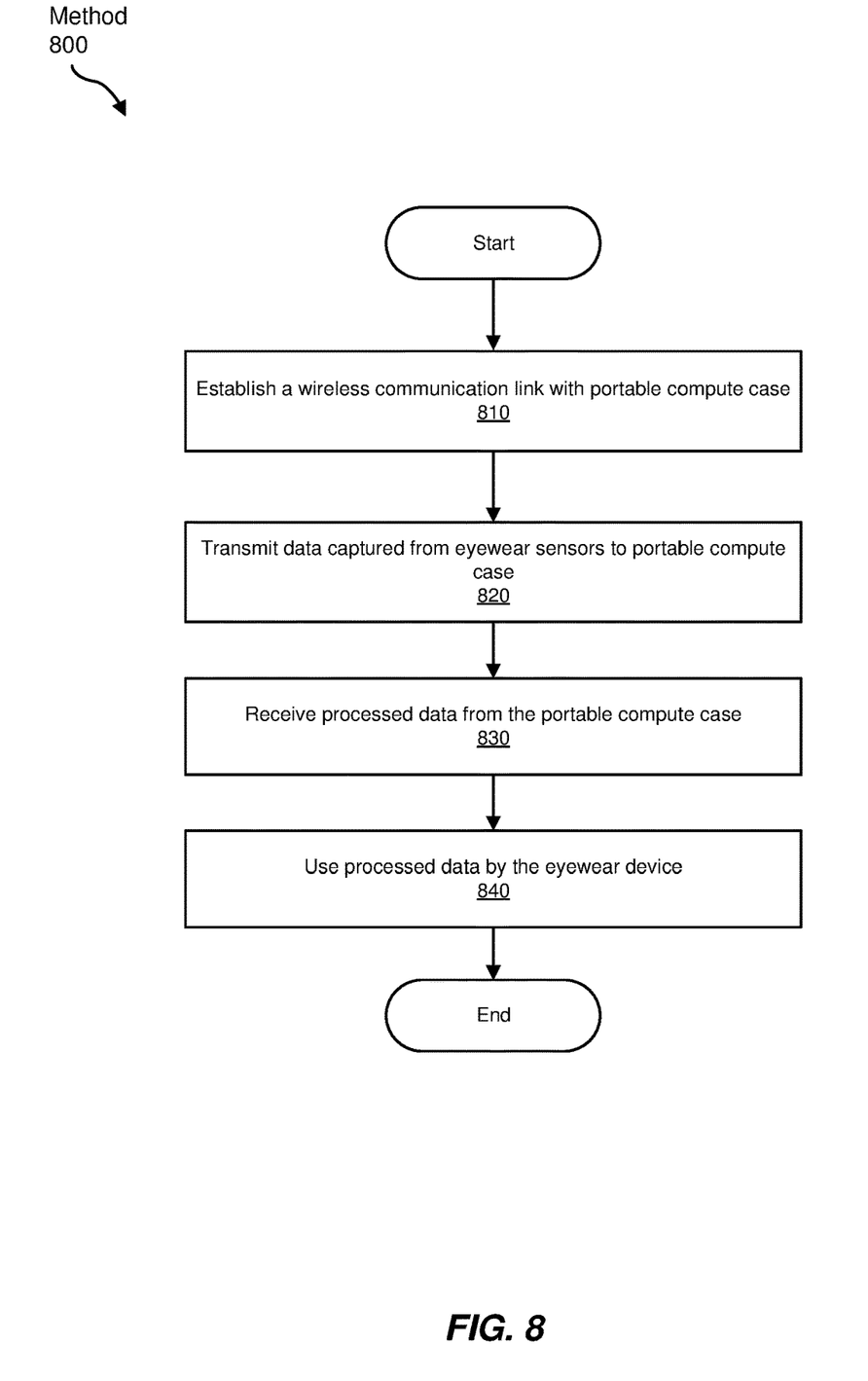
FIG. 8 is a flow diagram of a method for coupling a portable compute case and eyewear device from the perspective of the eyewear device in accordance with one or more embodiments of the disclosure.

FIGS. 7 and 8 are flow diagrams of exemplary computer-implemented methods 700 and 800, each of which may be implemented by any suitable computer-executable code and/or computing system, including the systems illustrated in FIGS. 1-6. In one example, each of the steps shown in FIG. 7 or FIG. 8 may represent an algorithm whose structure includes and/or is represented by multiple sub-steps, examples of which will be provided in greater detail below.

FIG. 7 is a flow diagram of a method for coupling a portable compute case and eyewear device from the perspective of the portable compute case in accordance with one or more embodiments of the disclosure. As illustrated in FIG. 7, at block 710 one or more of the systems described herein may detect that a portable compute case 606 for an eyewear device 602 has been opened. For example, a sensor 654 of the portable compute case 606 may detect when the case has been opened. In some examples, the sensor of the portable compute case 606 may then transmit an indication to a power management module 668 that the portable compute case 606 has been opened.

At block 720, the portable compute case 606 may terminate wireless battery charging of the eyewear device 602. For example, the power management module 668 may, in response to the indication received from the sensor 654, stop the transmission of power to the eyewear device 602.

At block 730, the portable compute case 606 may establish a wireless communication link with the eyewear device 602. In some embodiments, the portable compute case 606 may establish this wireless communication link via BLUETOOTH or another similar technology. In some examples, the portable compute case 606 may also power on the eyewear device 602 in response to the indication received from the sensor 654 that the portable compute case 606 has been opened.

At block 740, the portable compute case 606 may receive and process data. In some embodiments, this data may be received from an external device, such as the eyewear device 602. In some examples, the data may be processed, augmented, or otherwise transformed by the portable compute case 606 for display to a user of the eyewear device 602.

At block 750, the portable compute case 606 may transmit the processed data to the eyewear device 602 for display. In some embodiments, a computation module 664 may compress the processed data prior to transmitting the same to the eyewear device 602. The eyewear device 602 may then receive and decompress the compressed processed data and display the decompressed processed data on one or more display panels of the eyewear device 602.

FIG. 8 is a flow diagram of a method 800 for coupling a portable compute case and an eyewear device from the perspective of the eyewear device in accordance with one or more embodiments of the disclosure. As illustrated in FIG. 8, at block 810 one or more of the systems described herein may establish a wireless communication link between an eyewear device 602 of an AR or VR system with a portable compute case 606. For example, a wireless transceiver 616 of the eyewear device 602 may initiate a wireless link with a wireless transceiver 655 of the portable compute case 606 upon powering on. In some embodiments, the eyewear device 602 may power on in response to an indication that the portable compute case 606 has been opened.

At block 820, the eyewear device 602 may transmit data captured from various sensors (such as cameras 612, sensors 614, microphones 618, etc.) to the portable compute case 606. In some embodiments, a camera data aggregation module 628 may first aggregate data from cameras 612. The camera data aggregation module 628 may also communicate with a data manager 626. The data manager 626 may facilitate transmission of the data from the cameras 612 to the portable compute case 606 by the transceiver 616 of the eyewear device 602. In some examples, the data manager 626 may facilitate transmission of the data to the portable computer case 606 at predetermined time intervals. In some embodiments, the data manager 626 may also facilitate transmission of data from sensors 614 and/or microphones 618 of the eyewear device 602.

At block 830, the eyewear device 602 may receive processed data from the portable compute case 606. In some embodiments, the data manager 626 may determine that the processed data from the portable compute case 606 has been compressed. The data manager 626 may then facilitate decompression of the received processed data and may direct the decompressed processed data to one or more displays 620 of the eyewear device 602 for display.

At block 840, the eyewear device 602 may use the processed data received in step 830. For example, the one or more displays 620 of the eyewear device 602 may display the processed data received from the portable compute case 606.

As detailed above, the portable compute cases disclosed herein may represent portable companion devices designed to offload much of the compute workload from a VR or AR eyewear device or headset. In one example, such a portable compute case may serve as a base station for an eyewear device by performing VR or AR computations on behalf of the eyewear device and then wirelessly transferring video and data to or from the same. By doing so, the number and/or complexity of components on the eyewear device can be reduced significantly, resulting in a lighter, cooler, and more ergonomic or comfortable headset. The portable compute case may also incorporate one or more cameras designed to facilitate body tracking, relative user localization, or the like. The portable compute case may also be dimensioned to house or store the eyewear device, thereby eliminating the need for the user to carry multiple devices or accessories. In addition, the portable compute case may charge (e.g., wirelessly) the eyewear device when stored, and then trigger the headset to turn on when removed.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive sensor data to be transformed, transform the sensor data, output a result of the transformation to an eyewear device, use the result of the transformation to display data within an AR or VR system, and store the result of the transformation to the AR or VR system. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A portable compute case for an eyewear device, the portable compute case comprising:
a wireless transceiver;
a computation component comprising at least one processor, wherein the portable compute case is handheld and configured to:
  house the eyewear device;
  establish, using the wireless transceiver, a communicative connection between the portable compute case and the eyewear device;
  generate, using the computation component, processed sensor data; and
  transmit, using the wireless transceiver, the processed sensor data to the eyewear device for use by the eyewear device; and
a camera data aggregation component configured to determine when the eyewear device captures sensor data.

2. The portable compute case of claim 1, further comprising a power management component configured to transfer power to the eyewear device.

3. The portable compute case of claim 2, wherein the power management component comprises at least one of:
a charging element configured to draw the power from an alternating current (AC) power source;
a power storage element configured to store the power from the AC power source; or
a transmitting coil configured to inductively transfer the power to the eyewear device.

4. The portable compute case of claim 2, further comprising at least one sensor configured to at least one of:
detect when the eyewear device is positioned inside the portable compute case and, in response, direct the power management component to inductively transfer power to the eyewear device; or
detect when the portable compute case has been opened and, in response, direct the eyewear device to power on.

5. The portable compute case of claim 1, further comprising at least one external-facing camera configured to at least one of:
capture sensor data for tracking a user of the eyewear device; or
capture sensor data for localization of the eyewear device.

6. The portable compute case of claim 5, wherein the portable compute case is further configured to tune an antenna of the wireless transceiver based at least in part on the localization of the eyewear device.

7. The portable compute case of claim 1, further comprising a light-emitting diode (LED) configured to indicate a power status of at least one of:
the portable compute case; or
the eyewear device.

8. The portable compute case of claim 1, wherein the portable compute case is further configured to:
compress the processed sensor data; and
transmit the compressed processed sensor data to the eyewear device for use by the eyewear device.

9. A system comprising:
an eyewear device comprising an eyewear-side wireless transceiver; and
a portable compute case comprising:
  a case-side wireless transceiver;
  a computation component comprising at least one processor, wherein the portable compute case is handheld and configured to:
    house the eyewear device;
    establish a communicative connection between the case-side wireless transceiver of the portable compute case and the eyewear-side wireless transceiver of the eyewear device;
    generate, using the computation component, processed sensor data; and
    transmit, using the case-side wireless transceiver, the processed sensor data to the eyewear device for use by the eyewear device; and
  a camera data aggregation component configured to determine when the eyewear device captures sensor data.

10. The system of claim 9, wherein the eyewear device further comprises at least one of:
a battery; or
a wireless charging component.

11. The system of claim 10, wherein the portable compute case further comprises a power management component configured to inductively transfer power from the portable compute case to the battery of the eyewear device using the wireless charging component.

12. The system of claim 11, wherein the portable compute case further comprises at least one sensor configured to at least one of:
detect when the eyewear device is positioned inside the portable compute case and, in response, direct the power management component to inductively transfer the power to the eyewear device; or
detect when the portable compute case has been opened and, in response, direct the eyewear device to power on.

13. The system of claim 9, wherein the eyewear device further comprises:
a plurality of external-facing cameras configured to capture sensor data; and
the camera data aggregation component is further configured to aggregate the sensor data captured by the plurality of external-facing cameras for positional tracking.

14. The system of claim 13, wherein the eyewear device is configured to transmit, using the eyewear-side wireless transceiver, at least a portion of the sensor data captured by the plurality of external-facing cameras to the case-side wireless transceiver of the portable compute case for processing by the computation component of the portable compute case.

15. The system of claim 9, wherein the eyewear device further comprises a display element configured to display the processed sensor data.

16. The system of claim 15, wherein the eyewear device further comprises an eyewear-side computation component configured to:
receive processed data from the portable compute case or another external computing device;
decompress the processed data; and
use the decompressed processed data on the display element.

17. The system of claim 9, wherein the eyewear device further comprises an infrared light emitting diode (LED)

configured to emit infrared light to facilitate tracking of the eyewear device by the portable compute case.

18. The system of claim 9, wherein the eyewear device further comprises an audio sensor configured to capture audio data.

19. The system of claim 9, wherein the eyewear device further comprises an inertial measurement unit (IMU) sensor configured to capture a force or angular rate of the eyewear device.

20. A method comprising:
   establishing, by a wireless transceiver of a portable compute case that is handheld and dimensioned to house an eyewear device, a communicative connection between the portable compute case and the eyewear device;
   determining, by a camera data aggregation component of the portable compute case, when the eyewear device captures sensor data;
   receiving captured sensor data from the eyewear device;
   generating, by a computation component of the portable compute case, processed sensor data; and
   transmitting the processed sensor data to the eyewear device for use by the eyewear device.

* * * * *